United States Patent
Niemann et al.

(10) Patent No.: US 12,385,868 B2
(45) Date of Patent: Aug. 12, 2025

(54) DEVICE FOR THE DETECTION OF WETNESS IN WHEEL ARCHES

(71) Applicant: HELLA GmbH & Co. KGaA, Lippstadt (DE)

(72) Inventors: Thomas Niemann, Delmenhorst (DE); Hauke Baumgärtel, Ganderkesee (DE); Julien Bungalski, Bremen (DE); Paul Deron, Hamburg (DE); Karl Kreft, Achim (DE); Daniel Peretzki, Bremen (DE); Daniel Zöllner, Stuhr (DE)

(73) Assignee: HELLA GmbH & Co. KGaA, Lippstadt (DE)

( * ) Notice: Subject to any disclaimer, the term of this patent is extended or adjusted under 35 U.S.C. 154(b) by 169 days.

(21) Appl. No.: 18/461,186

(22) Filed: Sep. 5, 2023

(65) Prior Publication Data
US 2024/0077447 A1    Mar. 7, 2024

(30) Foreign Application Priority Data

Sep. 2, 2022   (DE) .......................... 102022122228.4

(51) Int. Cl.
G01N 27/22    (2006.01)
(52) U.S. Cl.
CPC .......... *G01N 27/223* (2013.01); *G01N 27/226* (2013.01)
(58) Field of Classification Search
CPC .. G01N 27/223; G01N 27/226; B62D 25/163; B62D 25/18
See application file for complete search history.

(56) References Cited

U.S. PATENT DOCUMENTS

| | | | |
|---|---|---|---|
| 5,751,071 A | 5/1998 | Netzer | |
| 10,946,839 B2 | 3/2021 | Salter et al. | |
| 11,464,435 B2 * | 10/2022 | Kabany | B60W 40/08 |
| 2008/0204260 A1 * | 8/2008 | Rienecker | B60S 1/0822 |
| | | | 340/604 |
| 2017/0248552 A1 * | 8/2017 | Niemann | G01N 29/222 |
| 2019/0145924 A1 * | 5/2019 | Kanning | G01N 27/223 |
| | | | 324/664 |
| 2021/0237742 A1 * | 8/2021 | Niemann | G01N 29/225 |

FOREIGN PATENT DOCUMENTS

| | | |
|---|---|---|
| DE | 29724046 U1 | 11/1999 |
| DE | 102019109040 A1 | 10/2019 |

* cited by examiner

*Primary Examiner* — Alvaro E Fortich
(74) *Attorney, Agent, or Firm* — MUNCY, GEISSLER, OLDS & LOWE, P.C.

(57) ABSTRACT

A device for the detection of wetness in wheel arches of road vehicles includes at least one sensor arrangement including at least one capacitive moisture sensor with two electrodes, electrically insulated with respect to one another, and with at least one evaluation unit, the electrodes, electrically insulated with respect to one another, are arranged on a carrier element, that the electrodes, electrically insulated with respect to one another, are formed by two detection sections arranged parallel to one another, and that the detection sections, when used as intended, are aligned respectively in a rising manner in their longitudinal extent. The device also relates to a road vehicle for the detection of wetness, with at least one wheel arch, with which provision is made according to the invention that the wheel arch is delimited by a wheel-housing shell, at which a device according to the invention is arranged.

10 Claims, 1 Drawing Sheet

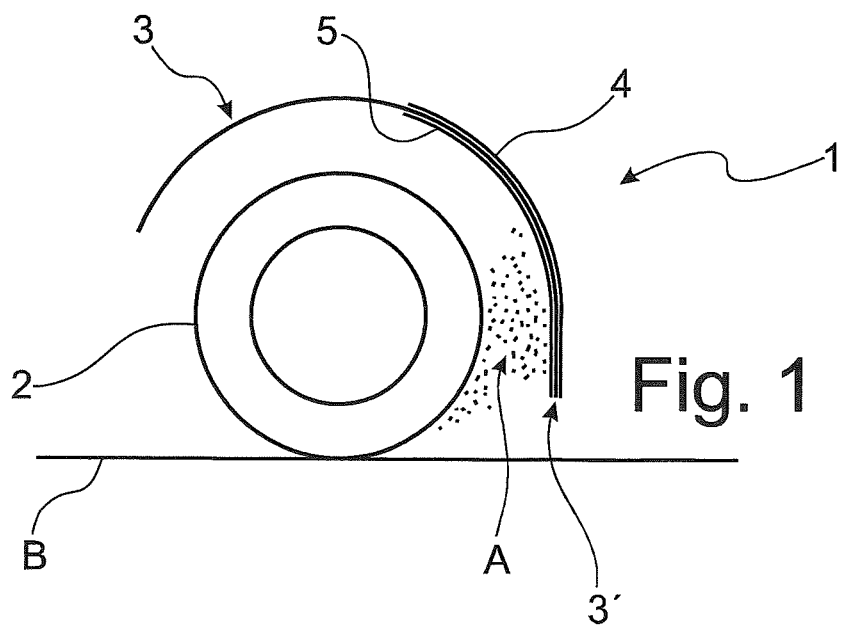
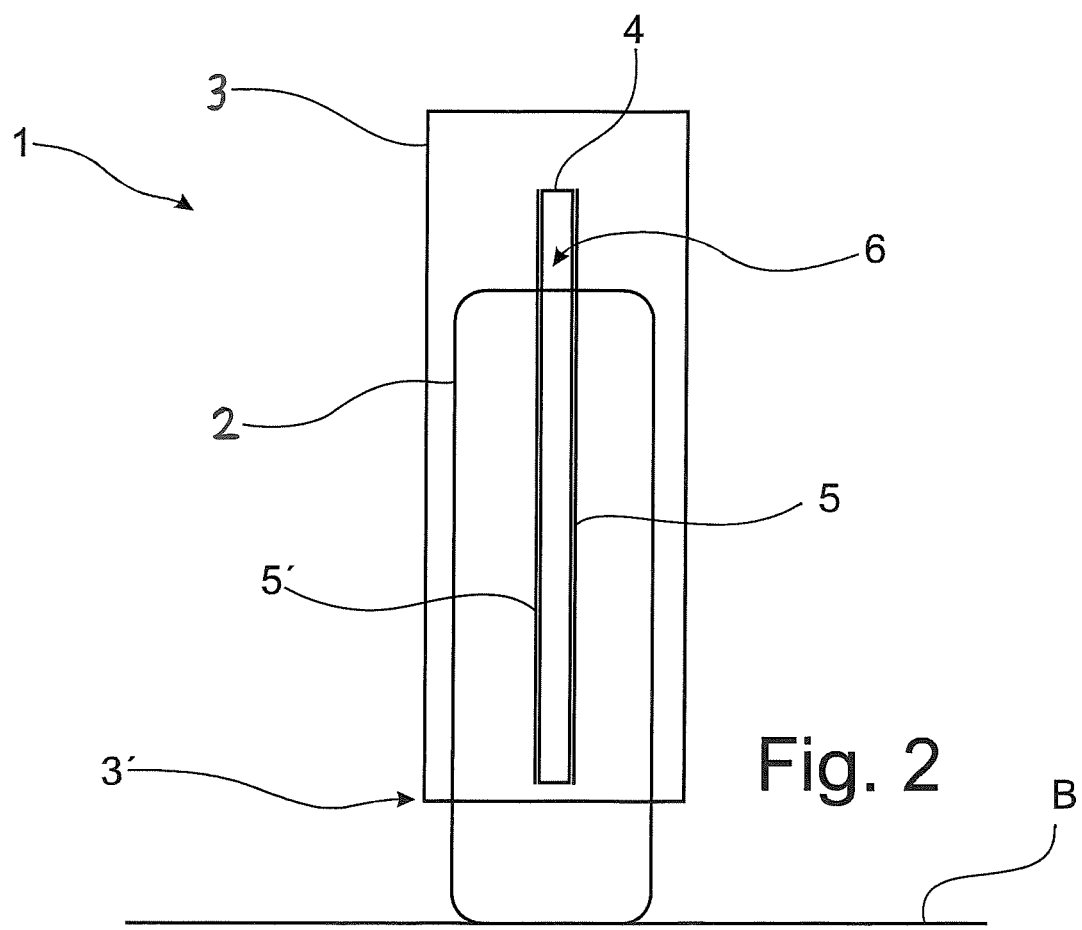

DEVICE FOR THE DETECTION OF WETNESS IN WHEEL ARCHES

FIELD OF DISCLOSURE

The invention relates to a device for the detection of wetness in wheel arches of road vehicles, with at least one sensor arrangement, and a road vehicle with such a device.

BACKGROUND OF THE INVENTION

As the road vehicle is travelling, conclusions can be drawn by means of the wetness accumulating in the wheel arches with regard to the roadway conditions and environmental conditions, which can then require corresponding actions, in order for example to increase the safety of the road vehicle and in particular of the occupants. Surface water situated on the roadway is a substantial influencing factor here on the driving behaviour of the road vehicle. Depending on the speed of the road vehicle, this surface water is swirled up by its wheels and thrown at the wheel arches.

In order to detect corresponding wetness, movable sensor membranes with piezoceramics were applied hitherto on the wheel side onto a wall of the wheel arch. Owing to their movable structure, these sensor membranes are, however, vulnerable to mechanical stress, such as for example stone chippings by gravel or suchlike situated on the roadway. Furthermore, solutions known from the prior art have only a relatively small measurement range, by which wetness can only be determined in a particular position or respectively height over a footprint of the road vehicle. In addition, relatively complicated calculation models must be created, in order to draw conclusions from movements of the sensor membrane with regard to the wetness which is swirled up.

SUMMARY OF THE INVENTION

It is therefore an object of the invention to further develop a corresponding device in that the above-mentioned disadvantages are eliminated or at least reduced.

The solution to this problem takes place with a device according to the features of Claim 1 and with a road vehicle according to the features of Claim 7. Further developments and advantageous configurations are indicated in the respectively subordinate claims.

The device for the detection of wetness in wheel arches of road vehicles with at least one sensor arrangement is distinguished according to the invention in that the sensor arrangement has at least one capacitive moisture sensor with two electrodes, insulated electrically with respect to one another, and with at least one evaluation unit, that the electrodes, insulated electrically with respect to one another, are arranged on a carrier element, that the electrodes, insulated electrically with respect to one another, are formed by two detection sections, arranged parallel to one another, and that the detection sections, when used as intended, are aligned respectively in a rising manner in their longitudinal extent. By the moisture being detected capacitively by means of electrodes which are insulated electrically with respect to one another, movable parts can be advantageously dispensed with, whereby possible damage due to stone chippings is distinctly reduced, or respectively has a lesser influence on the measurement result. A higher reliability of the measurement result is ensured here by a particular height range being covered by the detection sections on use as intended, so that depending on a particular speed of travel, wetness which is swirled up at a different height can be reliably detected. The measurement principle, based on a capacitive moisture sensor, without movable parts of the detection sections, also enables simpler calculation models here. In the evaluation unit, a conductivity determined at a particular moment in time at the electrodes thus only has to be compared with a saved conductivity and the present speed of travel, in order to conclude the status of the roadway or respectively corresponding environmental conditions.

In a further configuration, the detection sections can be formed by wires arranged on the carrier element. These can be adapted in a simple manner to differently configured wheel arches, so that the device is able to be adapted to a diversity of road vehicles.

In particular, the parallel detection sections, aligned respectively in a rising manner in their longitudinal extent when used as intended, then have a curved course. The latter can be adapted in a simple manner to a shape of a predetermined installation site, in particular to a respective wheel arch of a road vehicle.

According to a further development, provision is additionally made that the carrier element is a circuit board or another substrate with at least one recess, in particular with a central recess. The carrier element can thus be configured on the one hand in as material-saving a manner as possible, on the other hand a simple electrical insulation of the two electrodes with respect to one another is possible. The detection sections are then assigned accordingly respectively to a partial section of the carrier element, wherein the partial sections are, in turn, spaced apart from one another by the recess.

A compact design and a simple interconnection of the individual components of the device with one another is achieved furthermore by the evaluation unit being arranged or respectively formed on the carrier element.

Finally, provision is made that the sensor arrangement is encased with a medium-resistant material, in order to protect it from environmental influences. A casing of a medium-resistant material can be configured here so that it reduces both the consequences of stone chippings and other mechanical impairments, and also counteracts damage by aggressive substances. Medium-resistant is to be defined here to mean that the material is not attacked in its structure chemically by aggressive substances. Aggressive substances here can be, in addition to the ubiquitous road salt in winter, in particular also oils, dust and substances otherwise depositing themselves on roads.

The casing is preferably formed from a medium-resistant material of a resin or rubber. The detection sections, in particular the wires of the detection sections, are then let into the medium-resistant material such that they are in contact with the environment in an electrically conducting manner.

The invention also further concerns a road vehicle for the detection of wetness with at least one wheel arch, which is characterized in that the wheel arch is delimited by a wheel-housing shell, on which an above-mentioned device is arranged. At least the detection sections or the wires of the detection sections are arranged here on the wheel side on in the wheel-housing shell.

In order to ensure the best measurement results here, provision is further made that the sensor arrangement is arranged in a predetermined travel direction behind a wheel of the road vehicle which is assigned to the wheel arch. The predetermined travel direction of the road vehicle results here mostly through the technical construction of the road vehicle, which is established by positioning of the driver, and transmission design. Wetness which is swirled up by the wheel when the car is travelling is thus thrown directly in the direction of the detection sections. The height at which the wetness is swirled up is, in turn, dependent on the speed of travel.

In order to detect swirled up wetness as much as possible in an entire range of speed of travel of the road vehicle, provision is made furthermore that the detection sections extend upwards beginning from a lower end of the wheel arch, in particular the wetness is thus also detected at the lowest speeds, at which it is swirled up less high than at higher speeds. Due to construction, a measurement is limited here only by a predetermined ground clearance of the road vehicle on the vehicle side.

In order to also reliably detect the wetness at the highest speeds, provision is made furthermore that the detection sections extend to above a wheel, assigned to the wheel arch, starting from a footprint of the road vehicle. Thus, all angles are then detected in which water can be swirled up by the wheel in the direction of the wheel arch or wheel-housing shell of the wheel arch.

A particularly precise measurement is achieved in addition in that the detection sections are arranged centrally to a straight-ahead driving position of the wheel which is assigned to the wheel arch. This guarantees also when cornering that swirled up wetness is able to be detected with the greatest possible reliability.

BRIEF DESCRIPTION OF THE DRAWINGS

An example embodiment of the invention form which further features essential to the invention can ensue, is represented in the drawings. The same parts are provided here with the same reference numbers in all figures of the drawings. There are shown:

FIG. 1: a side view of a device according to the invention with a wheel arch and with a wheel; and FIG. 2: a cross-section through the wheel arch according to FIG. 1 with wheel illustrated in a transparent manner.

DETAILED DESCRIPTION

In FIG. 1 a wheel arch 1 is illustrated with a wheel 2, wherein a space of the wheel arch 1, accommodating the wheel 2, is delimited by a wheel-housing shell 3. The wheel-housing shell 3 surrounds the wheel 2 here at least to half of the wheel circumference and is arranged radially at a uniform distance with respect to a hub of the wheel 2. The device according to the invention for detecting wetness A is arranged at the wheel-housing shell 3 at a predetermined direction of travel behind the wheel 2. This is formed by a carrier element 4 which has a course of curvature equal to the wheel-housing shell 3. Viewed from the footprint B of the wheel 2, this carrier element 4 extends from a lower end 3' of the wheel-housing shell 3 to above the wheel 2. FIG. 1 further shows a detection section 5, which is arranged on the carrier element 4 on a side of the wheel-housing shell 3 facing the wheel 2, and extends over the complete length of the carrier element 4.

FIG. 2 illustrates once again that the detection sections 5, 5' extend over the entire length of the carrier element 4. The detection sections 5, 5' are arranged here parallel to one another at a uniform distance and, on travelling in straight ahead, are aligned centrally to the wheel 2 arranged in the wheel arch 1. Between the detection sections 5, 5', which are arranged spaced apart from one another, the carrier element 4 has a recess 6 which extends over the complete length of the detection sections 5, 5', so that these are electrically insulated with respect to one another in a reliable manner. With their lower end, facing the footprint B, the detection sections 5, 5', in contrast to the detection section 5 of FIG. 1, are arranged in a spaced manner with respect to a lower end 3' of the wheel arch 1.

FIG. 1 further shows how wetness A is swirled up in the wheel arch 1 and is thrown against the wheel-housing shell 3 with the detection sections 5, 5' when the travelling vehicle is in operation. The detection sections 5, 5' are aligned here with respect to the wheel 2 and to the swirled up wetness A so that the latter is detected in its entirety.

The invention claimed is:

1. A device for the detection of wetness in wheel arches of road vehicles, with at least one sensor arrangement, wherein
the sensor arrangement has at least one capacitive moisture sensor with two electrodes, electrically insulated with respect to one another, and with at least one evaluation unit, that the electrodes, electrically insulated with respect to one another, are arranged on a carrier element, and
the electrodes, electrically insulated with respect to one another, are formed by two detection sections arranged parallel to one another, which when used as intended, are aligned in a rising manner in their longitudinal extent respectively between their end regions.

2. The device according to claim 1, wherein the detection sections are formed by wires arranged on the carrier element.

3. The device according to claim 1, wherein the parallel detection sections, aligned respectively in a rising manner in their longitudinal extent when used as intended, have a curved course.

4. The device according to claim 1, wherein the carrier element is a circuit board or another substrate, with at least one recess or a central recess.

5. The device according to claim 4, wherein the recess has a length equal to the longitudinal extent of the detection sections.

6. The device according to claim 1, wherein the sensor arrangement is encased by a medium-resistant material.

7. A road vehicle for the detection of wetness with at least one wheel arch,
wherein the wheel arch is delimited by a wheel-housing shell, at which the device according to claim 1 is arranged.

8. The road vehicle according to claim 7, wherein the sensor arrangement is arranged in a predetermined travel direction behind a wheel which is assigned to the wheel arch.

9. The road vehicle according to claim 7, wherein the detection sections extend upwards beginning from a lower end of the wheel-housing shell when used as intended.

10. The road vehicle according to claim 7, wherein the detection sections extend, starting from a footprint of the road vehicle, to above a wheel which is assigned to the wheel arch.

* * * * *